(12) United States Patent
Van Haendel et al.

(10) Patent No.: US 11,225,019 B2
(45) Date of Patent: Jan. 18, 2022

(54) APPARATUS FOR PRODUCING AN OBJECT BY MEANS OF ADDITIVE MANUFACTURING AND METHOD OF USING THE APPARATUS

(71) Applicant: Additive Industries B.V., Eindhoven (NL)

(72) Inventors: Rob Peter Albert Van Haendel, Eindhoven (NL); Mark Johannes Magielsen, Eindhoven (NL); Mark Herman Else Vaes, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 185 days.

(21) Appl. No.: 16/609,998

(22) PCT Filed: May 7, 2018

(86) PCT No.: PCT/NL2018/050295
§ 371 (c)(1),
(2) Date: Oct. 31, 2019

(87) PCT Pub. No.: WO2018/203752
PCT Pub. Date: Nov. 8, 2018

(65) Prior Publication Data
US 2020/0061916 A1    Feb. 27, 2020

(30) Foreign Application Priority Data
May 5, 2017    (NL) ...................................... 2018850

(51) Int. Cl.
*B29C 64/245*    (2017.01)
*B29C 64/165*    (2017.01)
(Continued)

(52) U.S. Cl.
CPC .......... *B29C 64/245* (2017.08); *B29C 64/153* (2017.08); *B29C 64/165* (2017.08);
(Continued)

(58) Field of Classification Search
CPC ... B29C 64/153; B29C 64/165; B29C 64/245; B29C 64/25; B29C 64/255; B29C 64/259
See application file for complete search history.

(56) References Cited

U.S. PATENT DOCUMENTS 6,554,600 B1 *   4/2003   Hofmann ............... B29C 64/259
                                                                425/174.4
9,505,173 B2 *   11/2016  Maggiore ............. B29C 64/236
(Continued)

FOREIGN PATENT DOCUMENTS

DE          102011112581 A1 *  3/2013  ............. B22F 12/00
DE       10 2012 014 840 A1     1/2014
(Continued)

OTHER PUBLICATIONS

International Search Report for International Application No. PCT/NL2018/050295 dated Aug. 15, 2018.

*Primary Examiner* — Atul P. Khare
(74) *Attorney, Agent, or Firm* — Suiter Swantz pc llo

(57) ABSTRACT

Apparatus for producing an object by means of additive manufacturing, comprising:
  a process chamber for receiving on a build surface of a build plate a bath of powdered material which can be solidified;
  a support for supporting on a supporting surface thereof said build plate in relation to a surface level of said bath of powdered material, wherein said build plate is removably connectable to said supporting surface;
  a solidifying device for solidifying a selective part of said material by emitting electromagnetic radiation; and
(Continued)

a build plate takeover device comprising an actuating element for placing said build plate onto said supporting surface of said support for producing said object and removing said build plate from said supporting surface of said support. Method for producing an object by means of additive manufacturing.

12 Claims, 4 Drawing Sheets

(51) Int. Cl.
| | |
|---|---|
| B29C 64/264 | (2017.01) |
| B29C 64/153 | (2017.01) |
| B29C 64/295 | (2017.01) |
| B29C 64/227 | (2017.01) |
| B29C 64/25 | (2017.01) |
| B29C 64/259 | (2017.01) |
| B33Y 10/00 | (2015.01) |
| B33Y 30/00 | (2015.01) |

(52) U.S. Cl.
CPC ............ *B29C 64/227* (2017.08); *B29C 64/25* (2017.08); *B29C 64/259* (2017.08); *B29C 64/264* (2017.08); *B29C 64/295* (2017.08); *B33Y 10/00* (2014.12); *B33Y 30/00* (2014.12)

(56) References Cited

U.S. PATENT DOCUMENTS

| | | | |
|---|---|---|---|
| 10,105,895 B2* | 10/2018 | Stammberger | ........ B29C 64/245 |
| 10,119,108 B2* | 11/2018 | Maggiore | .............. B33Y 40/00 |
| 10,416,623 B2* | 9/2019 | Heugel | ................ B29C 37/0003 |
| 2013/0064707 A1 | 3/2013 | Matsui et al. | |

FOREIGN PATENT DOCUMENTS

| | | |
|---|---|---|
| DE | 10 2013 001 374 A1 | 7/2014 |
| EP | 2 897 781 A1 | 7/2015 |

* cited by examiner

APPARATUS FOR PRODUCING AN OBJECT BY MEANS OF ADDITIVE MANUFACTURING AND METHOD OF USING THE APPARATUS

TECHNICAL FIELD AND BACKGROUND

According to a first aspect the invention relates to an apparatus for producing an object by means of additive manufacturing.

According to a second aspect the invention relates to a method of producing an object by means of additive manufacturing on a build surface of a build plate, using an apparatus according to the first aspect.

3D printing or additive manufacturing refers to any of various processes for manufacturing a three-dimensional object. The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion.

One of the challenges in the manufacturing of three dimensional objects, in particular in additive manufacturing of metal objects, is achieving a desired accuracy of the manufactured object. According to prior art practice, an object is manufactured on a build plate, wherein the object is joined to the build plate through solidification of material used to build the object, wherein the build plate is removably connectable to a supporting surface of a support for supporting the build plate during manufacturing of the object. A drawback of this practice is a relative large variation in force required to separate the object from the build plate.

BRIEF SUMMARY

It is therefore an object of the invention to provide an apparatus for producing an object by means of additive manufacturing, having a reduced variation in force required to separate a manufactured object from the build plate.

Thereto, the invention provides an apparatus according to claim 1. The apparatus comprises a process chamber for receiving on a build surface of a build plate a bath of powdered material which can be solidified. A support is provided for supporting on a supporting surface thereof said build plate in relation to a surface level of said bath of powdered material, wherein said build plate is removably connectable to said supporting surface. A solidifying device, such as a laser device, for solidifying a layer of the material on the surface, in particular by means of electromagnetic radiation, is provided. To reduce the variation of separation force a build plate takeover device comprising an actuating element is provided. According to the invention, the variation of separation force is reduced by placing said build plate onto said supporting surface of said support, preferably for producing said object, and/or removing said build plate from said supporting surface of said support by said build plate takeover device comprising said actuating element. Placing said build plate onto said supporting surface by said takeover device allows for a more accurate placement of said build plate onto said supporting surface. By a more accurate placement of said build plate a more accurate solidification of said object at said build surface can be realized, thereby reducing the variation of separation force required for removing the object from the build surface. Removing said build plate from said supporting surface by said takeover device allows for a removal of said build plate from said supporting surface without the need to physically interact with the manufactured object for removing said build plate from said supporting surface. A physical interaction with said manufactured object to remove said build plate from said support surface to overcome a varying force required to remove said build plate from said supporting surface shortly after manufacturing of said object increases the variation in force required to separate in particular a relative small manufactured object from the build plate. Therefore removing said build plate from said supporting surface using said takeover device reduces the variation in force required to separate a manufactured object from the build plate.

A further advantage of placing said build plate onto said support surface of said support and/or removing said build plate from said supporting surface of said support is an increase of the production capacity of the apparatus. After manufacturing an object on said build plate the temperature of said build plate temperature has increased due to the manufacturing process. With the known apparatus the build plate is left to cool down before removing the build plate from the process chamber. Cooling down the build plate before removal from the process chamber reduces the productivity of the apparatus. The takeover device allows for a removal of the build plate without the need for a cool down period, or at least a shorter cool down period. [essential feature: takeover device resistant to heat]

In an advantageous embodiment of the apparatus said actuating element comprises a moveable supporting organ for supporting said build plate on said supporting surface in at least a first position of said supporting organ, wherein in a second position of said supporting organ said build plate is free from support of said supporting surface of said support, preferably wherein said moveable supporting organ is moveable relative to said support. Such a moveable supporting organ is advantageous for moving the build plate to a position wherein an object can be built on said build surface of said build plate and for moving the build plate to a position wherein said build plate is free from said supporting surface to allow removal of said build plate from said supporting organ.

In this regard it is beneficial if said build plate takeover device comprises a robot element for placing said build plate onto said moveable supporting organ in the second position thereof and/or removing said build plate from said moveable supporting organ in the second position thereof. A robot allows for a relative reliable and accurate placement of said build plate onto said supporting organ and/or a relative reliable and accurate removal of said build plate from said supporting organ.

In an practical embodiment of the apparatus said build plate is provided with a supporting organ recess, wherein said supporting organ is provided with an alignment profile at an end face thereof for supporting said build plate in said supporting organ recess. This is beneficial to allow for an improved alignment of said build plate in relation to said supporting organ.

It is advantageous if said build plate is provided with an alignment recess, wherein said supporting surface of said support is provided with an alignment protrusion for aligning said build plate in said alignment recess relative to said supporting surface. This is beneficial to allow for an improved alignment of said build plate in relation to said supporting surface.

Preferable said supporting surface of said support is provided with a heating element for heating said build plate in said first position of said supporting organ. Heating said build plate in said first position is beneficial for realising a more accurate solidification of said object at said build surface, thereby reducing the variation of separation force required for removing the object from the build surface.

In this regard it is beneficial if said support comprises a push element for pushing said heating element against said build plate in said first position of said supporting organ. Pushing said heating element against said build plate in said first position of said supporting organ using said pushing element is beneficial for realising a relative high and predictable heat transfer between the heating element and the build plate, thereby reducing the variation of separation force required for removing the object from the build surface.

In a practical embodiment of said apparatus said support comprises a sealing element for sealing said support and/or said build plate against a wall of said process chamber. A sealing element is advantageous for reducing material waste through powder material of said bath of powder material entering a space between a wall of said process chamber and said support and/or said build plate.

In this regard it is beneficial if said sealing element comprises an inflatable element for sealing said support and/or said build plate against said wall of said process chamber in an inflated state of said inflatable element. An inflatable element allows for a relative reliable sealing.

It is advantageous if said supporting surface is provided with a build plate takeover recess and/or said build plate is provided with a build plate takeover recess, wherein said actuating element comprises a moveable build plate takeover organ for supporting said build plate on said build plate takeover organ in a first position of said build plate takeover organ wherein said build plate takeover organ is at least partly disposed in said build plate takeover recess for placing said build plate onto said supporting surface of said support and/or removing said build plate from said supporting surface of said support. This is advantageous for realising a relative reliable build plate takeover device comprising a relative low number of moving parts.

According to a second aspect the invention relates to a method of producing an object by means of additive manufacturing on a build surface of a build plate, using an apparatus according to the first aspect of the invention. The method comprises at least one of the steps of:

placing said build plate onto said supporting surface of said support by said takeover device comprising said actuating element;

removing said build plate from said supporting surface of said support by said takeover device comprising said actuating element.

The advantages of the method according to the second aspect of the invention are analogue to the benefits of the apparatus according to the first aspect of the invention.

BRIEF DESCRIPTION OF THE DRAWINGS

Embodiments of the invention will be described in the following wherein.

DETAILED DESCRIPTION

Figure 1:
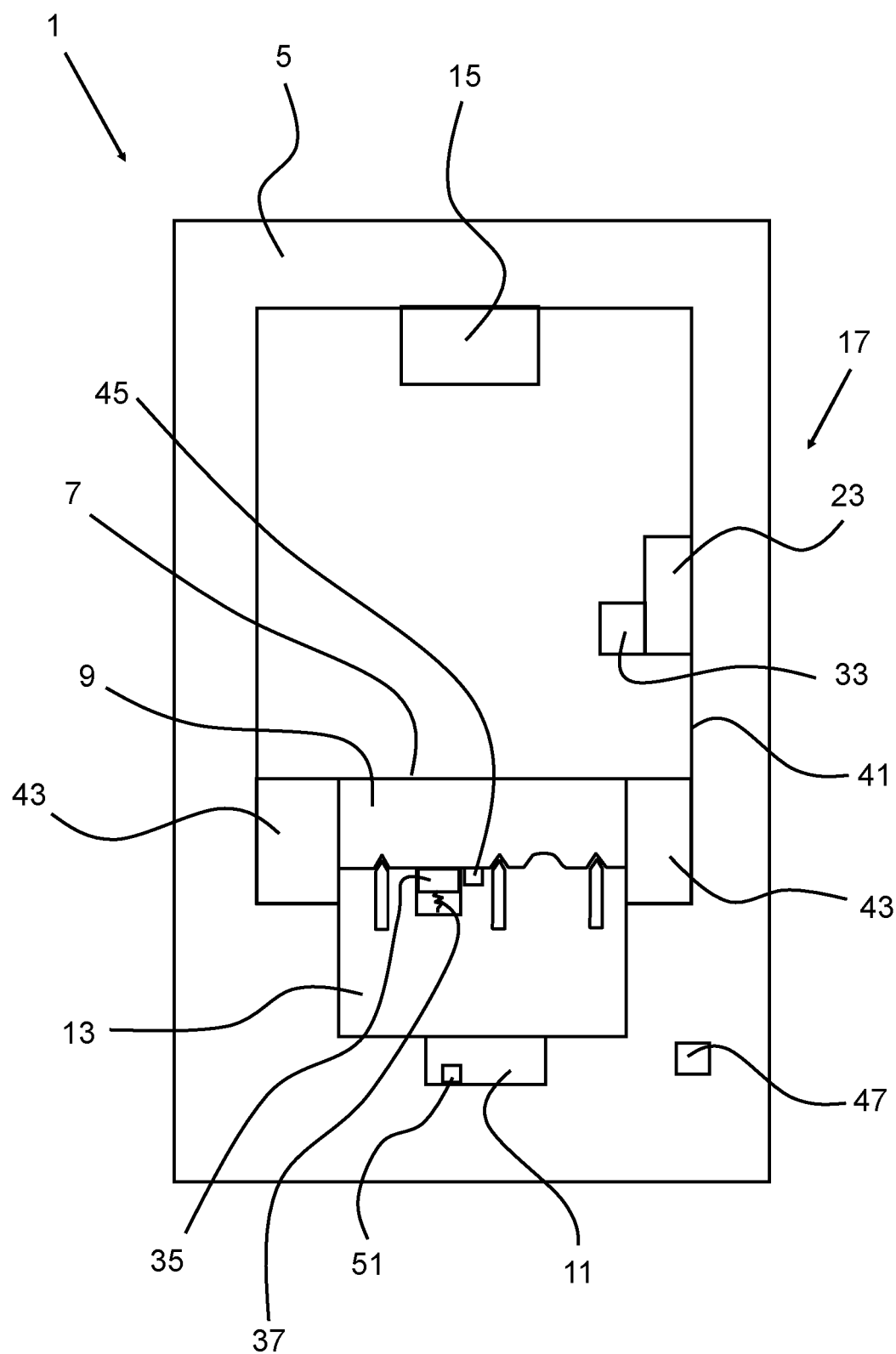
FIG. 1 is a schematic overview of an apparatus according to the present invention for additive manufacturing an object.
Figure 2:
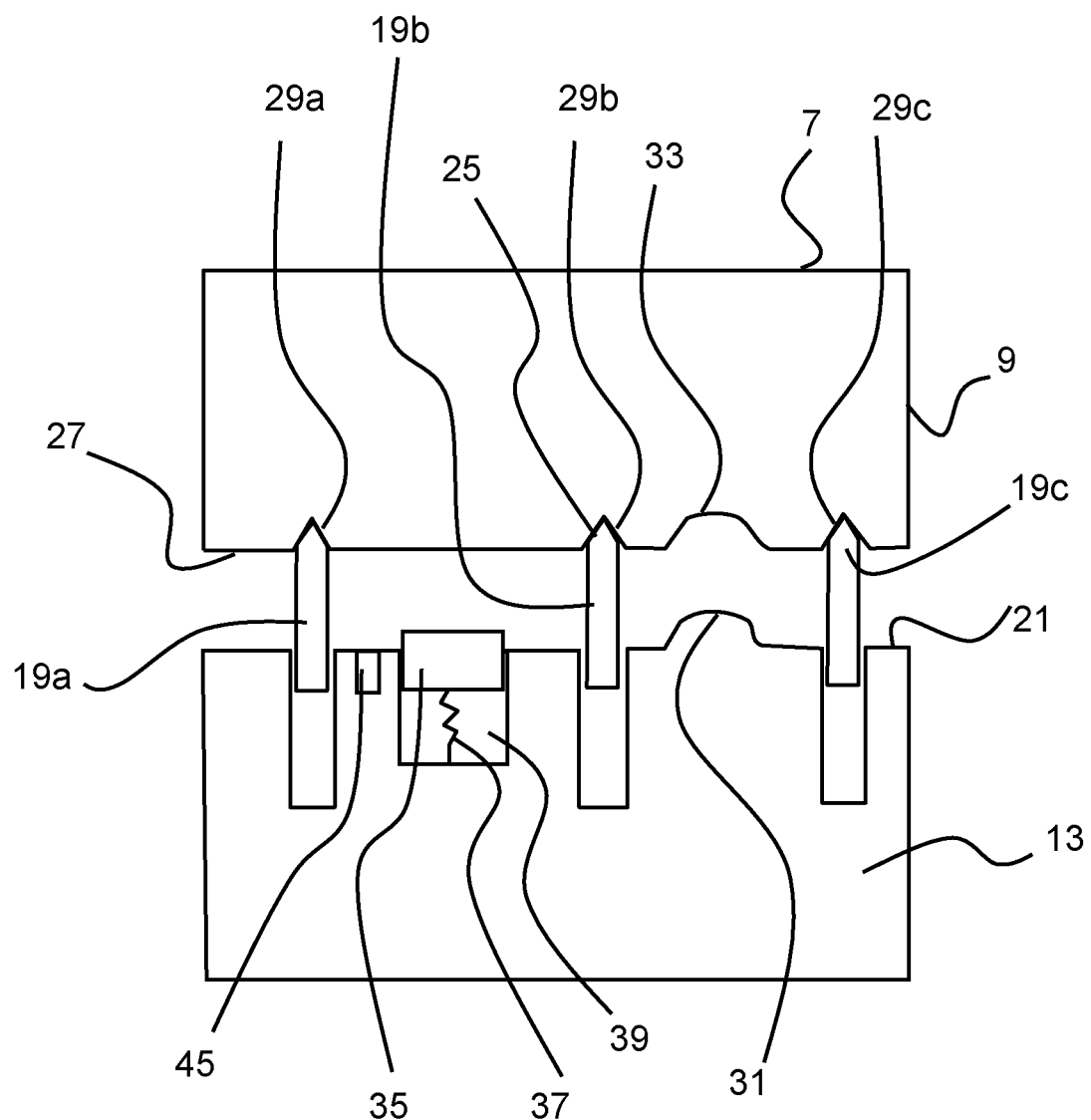
FIG. 2 is a schematic overview of a part of the apparatus of FIG. 1 in a first state.

FIG. 1 shows an overview of an apparatus 1 for producing an object by means of additive manufacturing. The apparatus 1 comprises a process chamber 5 for receiving a bath of powdered material which can be solidified. The bath of powdered material is receivable on a build surface 7 of a build plate 9. As can be seen in FIG. 2, the build plate 9 is on a supporting side 27 opposite of the build surface 7 thereof removably connected to a supporting surface 21 of a support 13. The supporting surface 21 is provided with an alignment protrusion 31 designed to cooperate with an alignment recess 33 provided on the supporting side 27 of the build plate 9. Referring back to FIG. 1, the support 13 is movably provided in a piston 11, such that after solidifying a layer, the support 13 may be lowered, and a further layer of material may be solidified on top of the part of the object already formed. A solidifying device 15 is provided for solidifying a selective part of the material. In the embodiment shown, the solidifying device 15 is a laser device, which is arranged for producing electromagnetic radiation in the form of laser light, in order to melt a powdered material provided on the build surface 7, which then, after cooling forms a solidified part of the object to be produced. However, the invention is not limited to the type of solidifying device.

The apparatus 1 comprises, in the embodiment shown in FIG. 2, a build plate takeover device 17. The build plate takeover device 17 comprises three movable supporting organs 19a, 19b, 19c. The three supporting organs 19a, 19b, 19c are provided with an alignment profile 25 at an end face for supporting said build plate 9 at the supporting side 27. The supporting side 27 is provided with three supporting organ recesses 29a, 29b, 29c for receiving the three supporting organs 19a, 19b, 19c. In a first position (FIG. 3), the movable supporting organs 19a, 19b, 19c are largely retracted into the support 13 for supporting said build plate 9 on said supporting surface 21. In a second position (FIG. 2), the movable supporting organs 19a, 19b, 19c extend outward of the supporting surface 21 to a larger extent than in the first position thereof to make the build plate 9 free from support of the supporting surface 21 of the support 13. The takeover device 17 further comprises a robot element 23 (see FIG. 1). The robot element 23 is provided with a build plate manipulation organ 33 for placing and removing the build plate 9 onto and from the three moveable supporting organs 19a, 19b, 19c when the three moveable supporting organs 19a, 19b, 19c are in the second position. In a practical embodiment, the manipulation organ 33 may be moved in the cavity formed between the build plate 9 and the support 13 when the supporting organs 19a, 19b, 19c are in the second position. Then the supporting organs 19a, 19b, 19c may be retraced towards the first position until the manipulation organ 33 carries the build plate 9. Then the manipulation organ 33 may move the build plate 9 away from the support 13.

Figure 3:
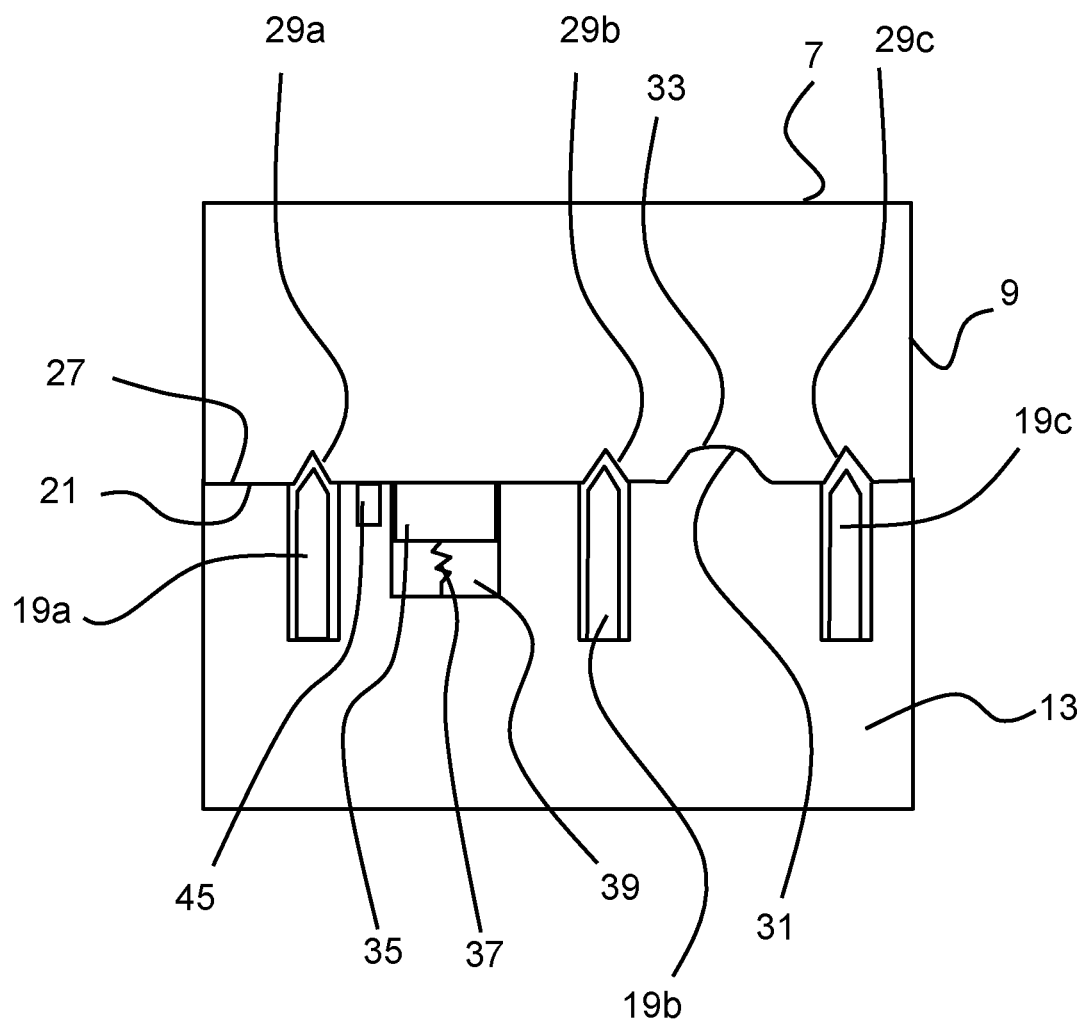
FIG. 3 is a schematic overview of a part of the apparatus of FIG. 1 in a second state.
Figure 4:
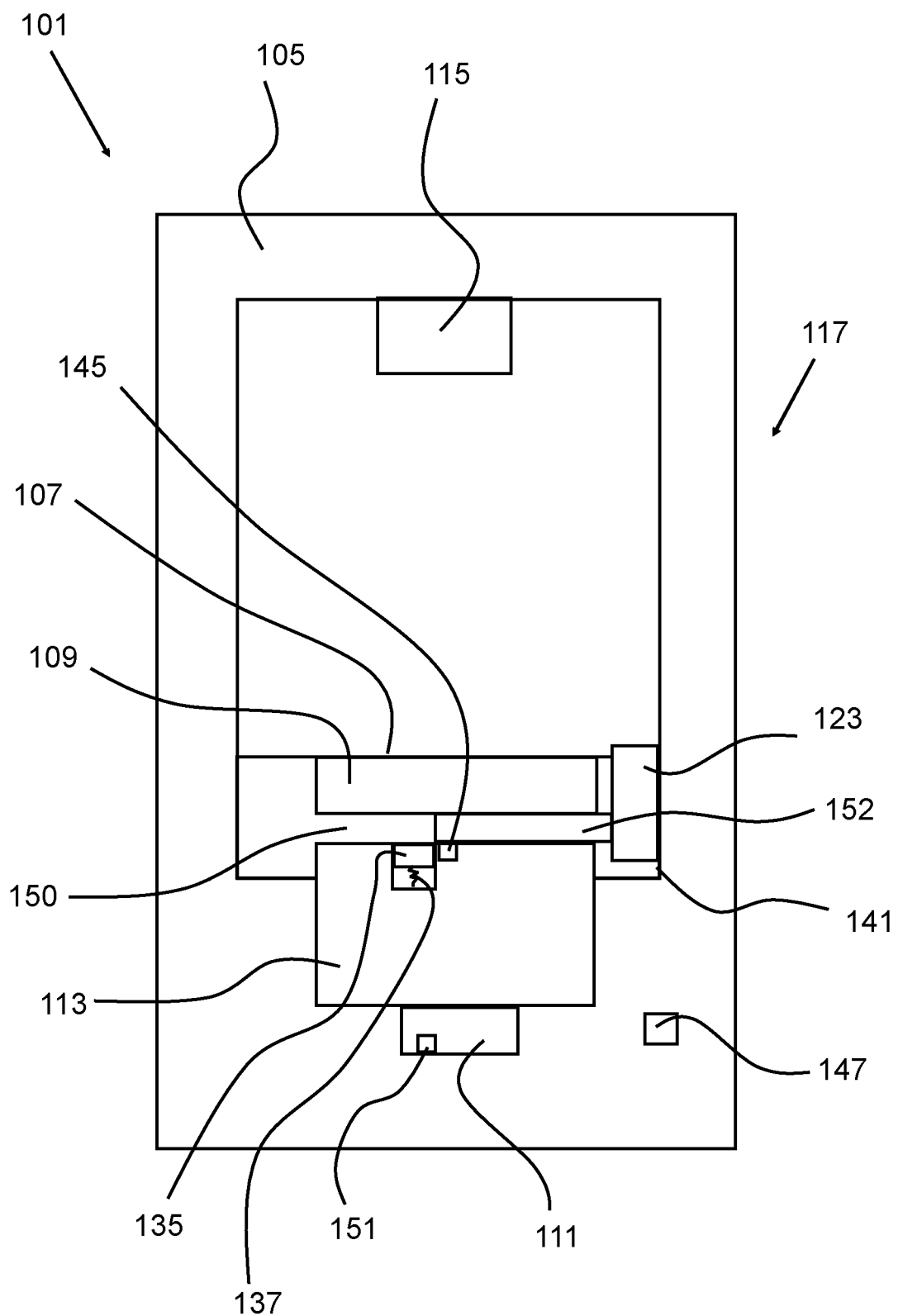
FIG. 4 is a schematic overview of an apparatus according to the present invention for additive manufacturing an object.

An exemplary embodiment of the takeover device 117 is shown in FIG. 4, which shows a further preferred embodiment of an apparatus 101. The reference numerals used to indicate components in FIG. 4 comparable to the components shown in FIGS. 1-3 are incremented by 100. Build plate 109 is provided with a build plate takeover recess 150. Apparatus 101 comprises an actuating element 123 for moving a build plate takeover organ 152 between a first position wherein said build plate take over organ 152 is disposed at least partly into said build plate takeover recess 150 and a second position wherein said build plate takeover organ 152 is outside said build plate takeover recess 150.

As best shown in FIG. 2, the support 13 is provided with a cavity 39 for receiving a movable heating element 35 and a spring 37. The spring 37 pushes the heating element 35 upwards, wherein the heating element 35 at least partly extends above the supporting surface 21 when said supporting organs 19a, 19b, 19c are in the second position of the supporting organs 19a, 19b, 19c. The spring 37 will push the heating element 35 against the supporting side 27 of the build plate 9 when the build plate 9 is placed on the supporting surface 21. The support 13 is further provided with an inflatable bag element 43 and a cooling unit 51 (FIG. 1). The inflatable bag element 43 seals a space present between the support 13 and the wall 41 of the process chamber 5 in the inflated state thereof.

The support 13 is further provided with a temperature measurement element 45 for measuring the temperature of build plate 9 and a control unit 47. The control unit 47 is coupled for communication with said temperature measurement element 45 and coupled for communication with said heating element 35. An urging element (not shown) in the form of a spring may be connected to this temperature measurement element 45 in order to urge said temperature measurement element 45 to the build plate 9. This increases the thermal contact, and ensures a more accurate measurement.

Furthermore, it is advantageous when the heating element 35 itself is provided with a temperature measurement element (not shown in FIG. 2). In that case, more precise information on the temperature of the heating element itself is obtained, which allows for more precise control of the temperature of the build plate.

It will be understood by those skilled in the art that a plurality of heating elements may be provided. In an embodiment (not shown) the support 13 may be provided with a plurality of cavities 39, each for receiving a movable heating element 35 and a spring 37 therein. As stated before, each spring 37 pushes the respective heating element 35 upwards. Each spring 37 will push the respective heating element 35 against the supporting side 27 of the build plate 9 when the build plate 9 is placed on the supporting surface. By providing a plurality of heating elements 35 a more precise and local control of the temperature profile of the build plate 9 will be possible.

Using the apparatus 1 an object can be manufactured as follows. The supporting organs 19a, 19b, 19c are moved to their first position. The robot element 23 holds a build plate 9 with the build plate manipulation organ 33 thereof. The robot element 23 moves the build plate 9 in a position wherein the build plate 9 rests with the supporting organ recesses 29a, 29b, 29c thereof on the supporting organs 19a, 19b, 19c. Subsequently robot element 23 moves the build plate manipulation organ 33 free from the build plate 9 and the supporting organs 19a, 19b, 19c are moved to their first position wherein the build plate 9 rests on the supporting surface 21. When the supporting organs 19a, 19b, 10c are in their first position the inflatable element 43 is inflated. After building the object on the build surface 7 of the build plate 9, the inflatable element 43 is deflated and the support organs 19a, 19b, 19c are move to their second position. The robot element 23 moves the build plate manipulation organ 33 towards a position wherein the build plate manipulation organ 33 can lift the build plate 9 free from the supporting organs 19a, 19b, 19c. Subsequently the robot element 23 lifts the build plate 9 from the supporting organs 19a, 19b, 19c.

The invention claimed is:

1. An apparatus for producing an object by means of additive manufacturing, the apparatus comprising:
  a process chamber for receiving on a build surface of a build plate of the apparatus a bath of powdered material which can be solidified;
  a support for supporting along a supporting surface thereof a supporting side of said build plate opposite of the build surface and for positioning said build plate in relation to a surface level of said bath of powdered material, wherein said build plate is removably connectable to said supporting surface;
  a solidifying device for solidifying a selective part of said material by emitting electromagnetic radiation; and
  a build plate takeover device comprising movable supporting organs against which supporting organ recesses defined in the supporting side of the build plate rest for placing said build plate onto said supporting surface of said support while said object is being produced and for removing said build plate and said object from said supporting surface of said support after producing said object.

2. The apparatus according to claim 1, wherein said moveable supporting organs support said build plate on said supporting surface in at least a first position of said supporting organs, wherein in a second position of said supporting organs said build plate is free from support of said supporting surface of said support, and wherein said moveable supporting organs are moveable relative to said support.

3. The apparatus according to claim 1, wherein said build plate takeover device further comprises a robot element for placing said build plate onto said moveable supporting organs and/or for removing said build plate from said moveable supporting organs.

4. The apparatus according to claim 3, wherein said robot element comprises a manipulation organ for placing and removing said build plate onto and from said movable supporting organs, and wherein said manipulation organ is moved in a cavity between said build plate and support for placing said build plate onto said supporting organs and/or for removing said build plate from said supporting organs.

5. The apparatus according to claim 1, wherein said supporting organs are provided with an alignment profile at respective end faces thereof for supporting said build plate in said supporting organ recesses.

6. The apparatus according to claim 1, wherein said build plate is provided with an alignment recess defined in the supporting side thereof, and wherein said supporting surface of said support is provided with an alignment protrusion cooperating with said alignment recess for aligning said build plate relative to said supporting surface.

7. The apparatus according to claim 1, wherein said supporting surface of said support is provided with a heating element for applying heat to said supporting side of said build plate.

8. The apparatus according to claim 7, wherein said support comprises a push element for pushing said heating element against said supporting side of said build plate.

9. The apparatus according to claim 1, wherein said support comprises a sealing element for sealing said support and/or said build plate against a wall of said process chamber.

10. The apparatus according to claim 9, wherein said sealing element comprises an inflatable element for sealing said support and/or said build plate against said wall of said process chamber in an inflated state of said inflatable element.

11. The apparatus according to claim 1, further comprising an inflatable sealing element for sealing against said build plate and support while said object is being produced.

12. A method of producing an object by means of additive manufacturing using an apparatus according to claim 1, the method comprising the steps of:
- placing said build plate onto said supporting surface of said support by said takeover device comprising said supporting organs;
- emitting said electromagnetic energy by said solidifying device to solidify said selective parts of said material so as to form said object while said supporting side of said build plate is supported along said supporting surface of said support; and
- removing said build plate and said object from said supporting surface of said support by said takeover device.

* * * * *